United States Patent [19]
Leiber

[11] Patent Number: 4,589,706
[45] Date of Patent: May 20, 1986

[54] VEHICLE BRAKE SYSTEM FOR CONTROLLING WHEEL BRAKE SLIPPAGE AND WHEEL DRIVE SLIPPAGE

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 672,972

[22] Filed: Nov. 19, 1984

[30] Foreign Application Priority Data

Jan. 19, 1984 [DE] Fed. Rep. of Germany ....... 3401690

[51] Int. Cl.$^4$ .......................... B60T 8/02; B60T 13/14
[52] U.S. Cl. ................................ 303/114; 188/181 R; 303/119
[58] Field of Search .................... 303/114, 119, 61–63, 303/68–69, 6 R, 10–12, 100, 92; 188/181, 345; 60/545, 548, 547.1; 180/197

[56] References Cited

U.S. PATENT DOCUMENTS

| | | | |
|---|---|---|---|
| 4,111,496 | 9/1978 | Leiber | 303/114 X |
| 4,286,826 | 9/1981 | Leiber | 303/114 |
| 4,405,183 | 9/1983 | Resch | 303/114 X |

FOREIGN PATENT DOCUMENTS 2103319  2/1983  Fed. Rep. of Germany ...... 303/114

*Primary Examiner*—Douglas C. Butler
*Attorney, Agent, or Firm*—Edwin E. Greigg

[57] ABSTRACT

A vehicle brake system including a brake force booster, controllable a brake pedal, for actuating a main brake cylinder in order to supply wheel brake cylinders with braking pressure for service braking operations and also includes brake pressure control valves, which direct braking pressures into individual wheel brake cylinders if there is a danger that the wheels will lock during braking. To this end, pressure is supplied to the brake pressure control valves from the brake force booster via controlled valves. In order to be able to reduce drive slip as well, the controlled valves are embodied as a switchover valve, so that pressure can be directed to the brake pressure control valves directly from a pressure supply container bypassing the brake force booster. The vehicle brake system is inexpensively further embodied for reducing drive slip by modifying the control valves.

20 Claims, 4 Drawing Figures

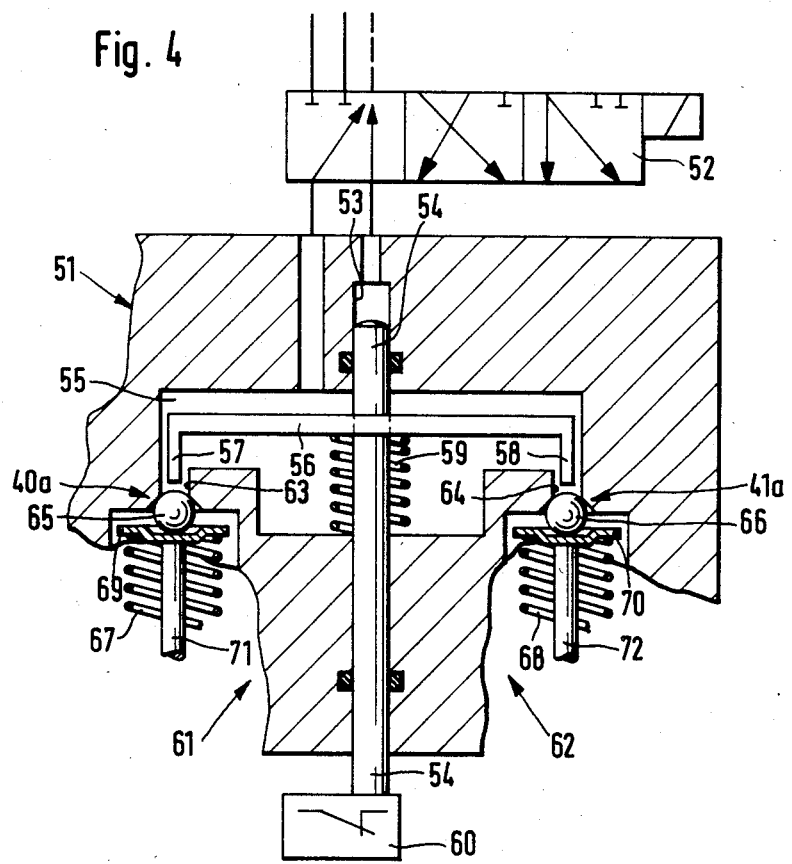

4,589,706

VEHICLE BRAKE SYSTEM FOR CONTROLLING WHEEL BRAKE SLIPPAGE AND WHEEL DRIVE SLIPPAGE

BACKGROUND OF THE INVENTION

The invention is based on a vehicle brake system. A vehicle brake system set forth in copending U.S. patent application Ser. No. 548,044 filed Nov. 2, 1983 has a brake force booster with a booster chamber; a main brake cylinder having at least one brake piston; two separate service brake circuits with wheel brakes; a control valve disposed between a pressure source and the booster chamber and actuatable via a brake pedal in order to direct a booster pressure into the booster chamber; and finally brake pressure control valves, associated with the wheel brakes and intended for reducing wheel slip, and valve means for temporarily connecting at least one of the brake pressure control valves to the booster chamber. In the event of drive slip, at least one of the brake pressure control valves is supplied with pressure from the booster chamber. Pressure buildup in the booster chamber is effected via an adjusting drive means which in place of the brake pedal actuates the control valve. The adjusting drive means is embodied as an electromagnet, by way of example. The disposition of electromagnets in brake systems having anti-skid means necessitates considerable alteration of the housings of the brake force booster. Because of the power required, the electromagnet and the control unit required to control it are quite expensive. The use of a hydraulic adjusting drive instead of the electromagnet is likewise very expensive.

OBJECT AND SUMMARY OF THE INVENTION

The vehicle brake system according to the invention has the advantage over the prior art that the brake force booster can be retained without alteration, and no notable changes need to be made in the housing. The brake system can attain the same functions using conventional magnetic valves. Costs are reduced because these magnetic valves can be accommodated outside the housing, inside a valve block together with the brake force control valves. Connecting the system electrically to a control unit is also simplified thereby.

The invention will be better understood and further objects and advantages thereof will become more apparent from the ensuing detailed description of preferred embodiments taken in conjunction with the drawings.

BRIEF DESCRIPTION OF THE DRAWINGS

FIG. 4 shows a detail of the vehicle brake system of FIG. 3, on an enlarged scale.

DESCRIPTION OF THE PREFERRED EMBODIMENTS

Figure 1:
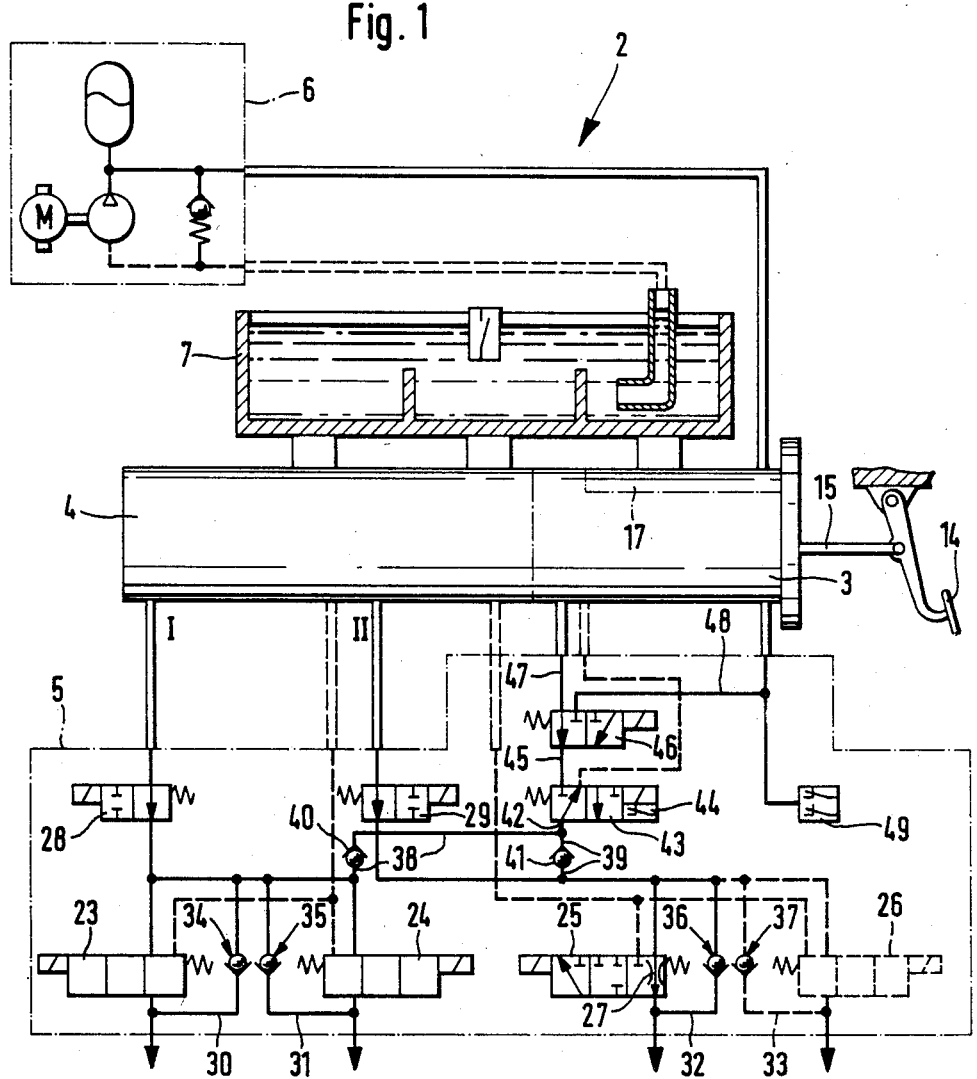
FIG. 1 shows a first exemplary embodiment of the vehicle brake system according to the invention.
Figure 2:
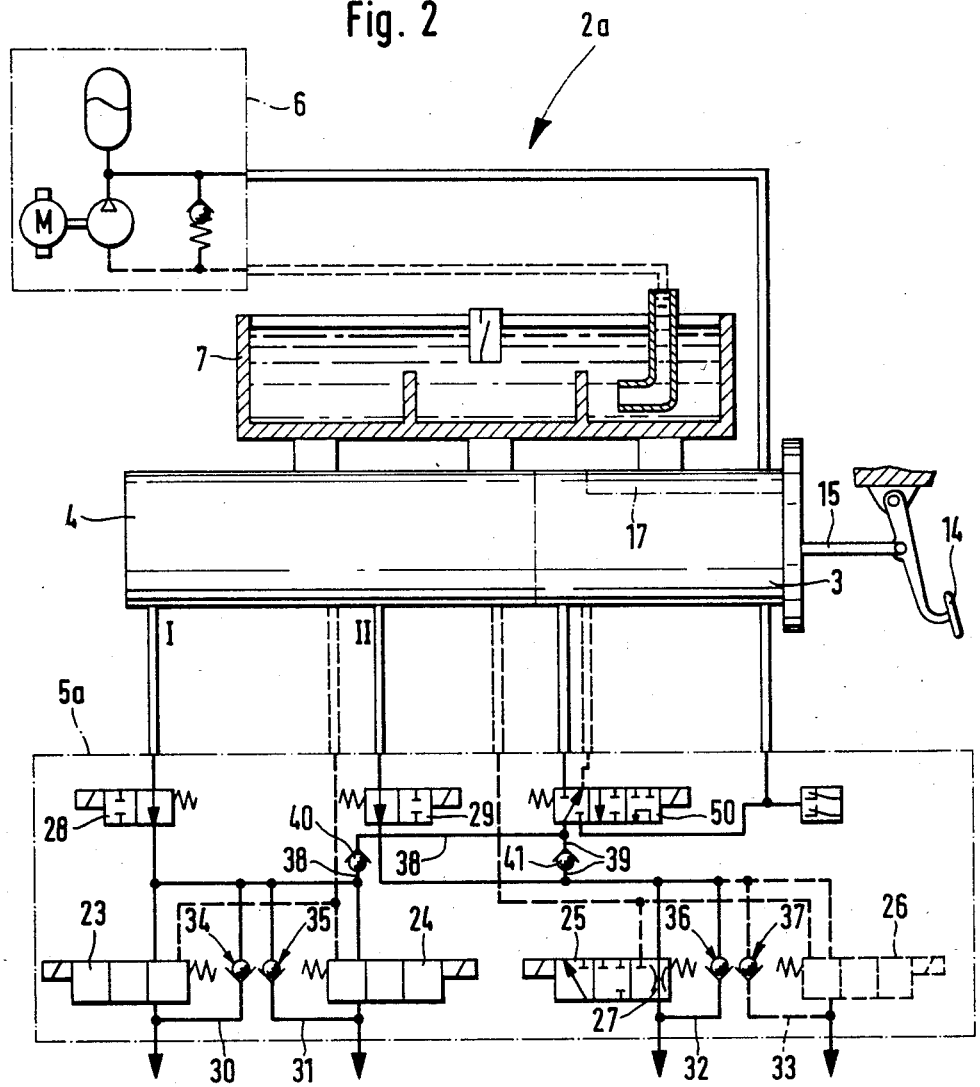
FIG. 2 shows a second exemplary embodiment of the vehicle brake system.
Figure 3:
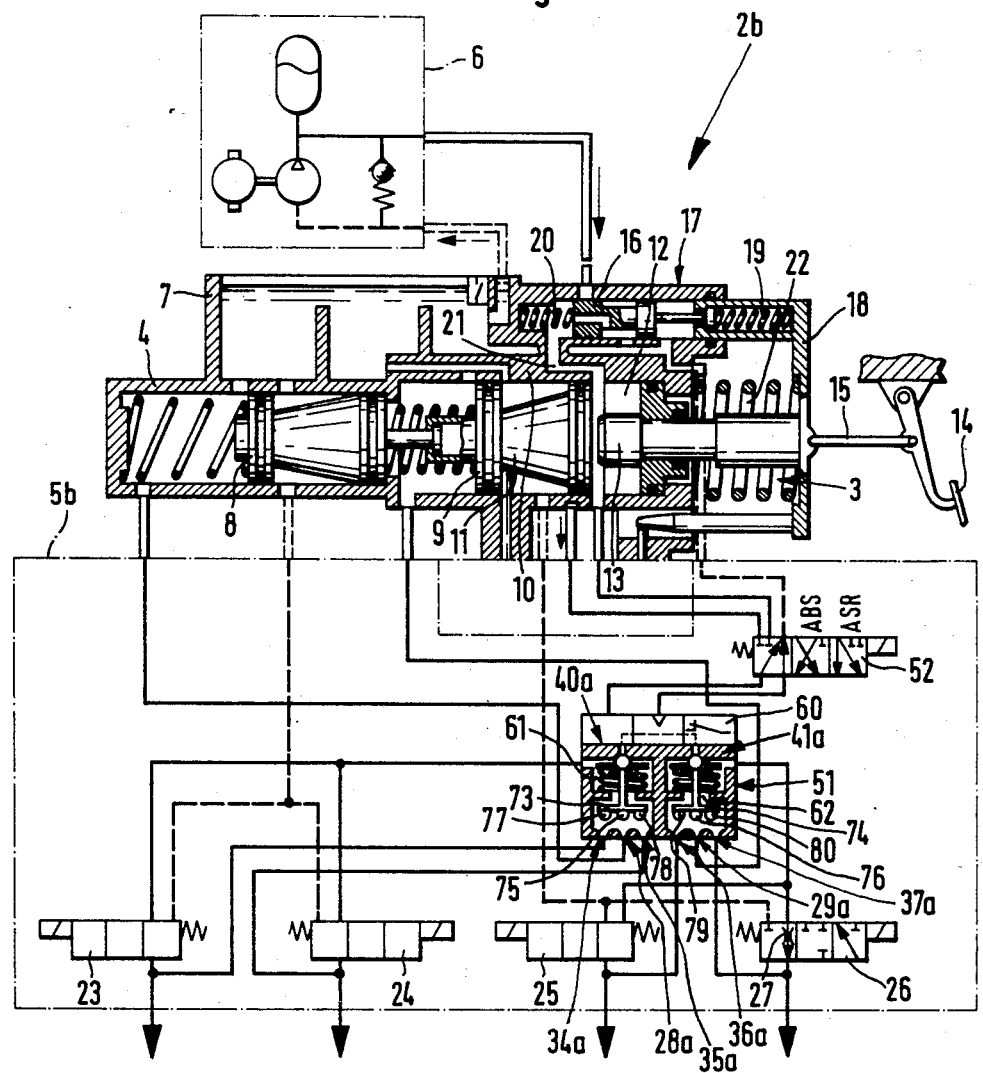
FIG. 3 shows a third exemplary embodiment of the vehicle brake system.

The exemplary embodiments of vehicle brake systems 2, 2a, 2b respectively shown in FIGS. 1, 2 and 3 have brake force boosters 3 and main cylinders 4 which by way of example are identical, of known design and combined into a structural unit; valve blocks 5, 5a, 5b with differing internal structures; and pressure supply means 6 which by way of example are embodied identically.

The pressure supply means 6 may be found in the prior art, so a detailed description of them is not necessary here.

In the main brake cylinder 4, which is located beneath an equalizing fluid supply container 7 for a pressure medium, two brake pistons 8, 9 are disposed one behind the other and are displaceable relative to one another. The brake piston 8 is part of a service brake circuit I, and the brake piston 9 is part of a service brake circuit II as shown in FIG. 3.

The brake force booster 3 has a booster cylinder 10 and a booster piston 11 displaceable therein, which acts upon the brake piston 9. The booster cylinder forms a booster chamber 12, which is defined in the axial direction, toward the main cylinder 4, by the booster piston 11. An auxiliary piston 13 extends into the booster chamber 12. The auxiliary piston 13 is movable toward the booster piston 11 by means of a brake pedal 14 via a pedal tappet 15. If the pressure supply means 6 should fail, then the brake piston 9 can be displaced directly by the brake pedal 14, in order to generate braking pressure exclusively by the exertion of muscular force. A control piston 16 of a control valve 17 is disposed parallel to the booster cylinder 10. The auxiliary piston 13 has an arm 18 connected thereto. The arm 18 acts upon the control slide 16, which is loaded in the direction of the arm 18 by a counterspring 20, via a travel-limiting spring 19. The control valve 17 is connected to the pressure supply means 6. If the arm 18 is displaced by pressure exerted upon the brake pedal 14, the control slide 16 partially follows the travel of the arm 18, because of the action of the springs 19 and 20. If the control slide 16 is displaced sufficiently, it opens the control valve 17 to the pressure medium pump supply means 6, causing a pressure to build up in the control valve 16 which pressure extends on into the booster chamber 12 via channel 21 and there builds up a booster pressure on the back of piston 11. This booster pressure is exerted upon the booster piston 11, which in turn, as when the piston 11 is actuated via the auxiliary piston 13, displaces the brake pistons 8 and 9 and thereby generates braking pressure in the brake circuits I and II. If the brake pedal 14 is released, then because of the restoring force of a restoring spring 22 the auxiliary piston is moved toward the brake pedal in the direction of this initial position. As a result, the control slide 16 also returns to a position in which it blocks off the control valve 17 with respect to the pressure medium supply means 6. Upon further movement of the control slide 16 toward the arm 18, pressure is reduced within the control valve 17 in the chamber including spring 20 causing the booster pressure in the booster chamber 12 to drop as well, and causing the brake pistons 8 and 9 to return to their initial positions.

Electromagnetically controllable brake pressure control valves 23, 24, 25 and 26 associated with the brake circuits I and II are accommodated in each of the valve blocks 5, 5a, 5b. They are embodied, for example, in the form of known 3/3-way valves and in their normal non-current-carrying state they assume basic positions which permits the fluid medium to flow-through, or are positioned in an open position. For these open positions the control valves have throttling flowthrough conduits 27. Further positions, which are triggered electrically, are a brake pressure maintenance position and a brake pressure reduction position. Wheel brake cylinders, not shown, for driven and non-driven wheels of a vehicle are connected to these brake pressure control valves 23-26 as represented by the arrows. Wheel brake cylinders and brake pressure control valves are associated on both sides of the vehicle with those wheels that are disposed on the same axle and are driven via a differential gear. If for instance the vehicle has a driven front axle i.e., front wheel drive, then the brake pressure control valves associated with the left and right wheels of this axle may be the valves 23 and 24.

In the first two exemplary embodiments according to FIGS. 1 and 2, a blocking valve 28 is included in the brake circuit I and a blocking valve 29 is included in brake circuit II. These blocking valves are embodied as 2/2-way magnetic valves and are disposed immediately following the main cylinder 4. In their normal non-current-carrying basic positions, these blocking valves connect the main cylinder 4 with the brake pressure control valves 23 and 24, or 25 and 26, respectively. Bypass conduits 30, 31, 32 and 33 bypass the brake pressure control valves 23, 24, 25 and 26. One-way bypass valves 34, 35, 36 and 37, which open toward the main cylinder 4, are incorporated in these bypass conduits 30, 31, 32 and 33. They serve to accelerate brake pressure reduction at the end of normal service braking. Pressure feed conduits 38 and 39 discharge into the service brake circuits I and II between the blocking valves 28 and 29 and the brake pressure control valves 23 and 24, or 25 and 26, respectively. Check valves 40 and 41 which open in the direction of the brake circuits I and II are incorporated in the pressure feed conduits 38 and 39, respectively.

In the first exemplary embodiment, the pressure feed conduits 38, 39 communicate via a common pressure medium flow conduit 42 connected with a feed valve 43 known per se. This valve 43 is electromagnetically actuatable and is embodied as a 3/2-way valve, and it has a switching position monitoring switch 44. In its normal basic position, without current applied, the feed valve 43 connects the conduit 42 to the equalizing container 7 via appropriate conduits. From the feed valve 43, a conduit 45 leads to a switchover valve 46. This valve communicates via a conduit 47 with the booster chamber 12 and via an additional conduit 48 with the pressure supply means 6 via the brake force booster 3. The switchover valve 46 is embodied as a magnetically actuatable 3/2-way valve and in its current-free normal basic position, connects the booster chamber 12 to the feed valve 43 via conduit 47. In the event that drive slip occurs at at least one of the wheels with which the brake pressure control valves 23 and 24 are associated, the switchover valve 46 is switched over by slip detector control unit which is not shown, as a result of which the switchover valve 46 disconnects the feed valve 43 from the booster chamber 12 and connects the switchover valve 46 instead to the pressure supply means 6 via conduit 48. As a result, pressure is supplied directly to the feed valve 43, without making a detour through the booster chamber 12. The pressure supply means 6 acts upon a pressure monitoring switch 49. Only if the switch 49 reports a sufficient minimum pressure to the control unit 44 can the control unit direct the feed valve 43 into the feed position and the brake pressure control valves 23, 24, 25, 26 into positions other than the basic positions shown. In the event of pressure failure, the pressure monitoring switch 49 thus prevents the pressure medium in the brake circuits I and II from becoming exhausted, which could cause an accident during braking. The switching position monitoring switch 44 disposed on the feed valve 43 also makes the brake pressure control valves 23-26 available for triggering only if the feed valve 43 has been switched over and is thus actually capable of feeding pressure into the brake circuits I and II.

No later than when the feed valve 43 is triggered, the blocking valves 28, 29 are also moved into their blocking positions, at least whenever drive slip must be suppressed. The blocking valves 28, 29 prevent an escape of pressure medium through the main brake cylinder 4 into the equalizing chamber 7. This provision is always necessary in the event of drive slip, because in that case the booster chamber 12 is not supplied with pressure, and accordingly the brake pistons 8, 9 do not close off the main cylinder 4 with respect to the equalizing container 7.

As long as there is drive slip at at least one of the driven wheels, the valves 43 and 46 remain in the positions described. If slip occurs at only one wheel, then the associated brake pressure control valve 23 or 24 will remain in its pressure buildup position, while the brake pressure control valve of the non-slipping wheel is directed into the blocking position, and the wheel is accordingly not braked. A pressure reduction in the wheel brake cylinder of a braked wheel is made whenever the slip has been reduced to a predetermined amount. To this end, the associated brake pressure control valve 23 or 24 is then directed into its brake pressure reduction position. If drive slip is no longer present, the cause may be that the driver of the vehicle no longer wishes to accelerate or press down on the gas pedal but intends to apply the brake instead. Therefore, if drive slip is no longer present, at least the switchover valve 46 must be returned to its basic position. This can be effected for instance by making the switchover valve 46 current-free and by the action of a restoring spring. At that time, there is at least the possibility that pressure for braking the vehicle will be available at the vehicle brakes, having been directed into the booster chamber 12 by means of the brake pedal 14. On the other hand, if the wheels that are to be braked are not tending to lock or skid, and the feed valve 43 is moved into its basic position and the blocking valves 28 and 29 are directed into the flow-through position, then any service braking that may be required is performed in a manner known per se using pressure medium from the main brake cylinder 4. Once braking initiated in this manner has been ended, the pressure medium flows in an accelerated manner to the main cylinder 4, partially bypassing the throttles 27 by way of the one-way bypass valves 34, 35, 36 and 37.

The second exemplary embodiment of the vehicle brake system 2a shown in FIG. 2 differs from the first in that instead of the feed valve 43 and the switchover valve 46 thereof of the first exemplary embodiment, a 4/3-way switchover valve 50 is used, which assumes the functions of both the feed valve 43 and the switchover valve 46. Accordingly, this valve 50 connects the brake pressure control valves 23-26 to the booster chamber 12 or directly to the pressure supply means 6 as needed, and subsequently opens toward the equalizing container 7. The space required to accommodate the system and mechanical expense are both reduced as compared with the first exemplary embodiment. As a result, the valve assembly described is more easily accommodated in the valve block 5a.

In the third exemplary embodiment of a vehicle brake system 2b shown in FIGS. 3 and 4, the functions of the blocking valves 28, 29, the check valves 40, 41 and the bypass valves 34–37 described above are combined into one valve combination 51; and a 5/3-way switchover valve 52 used instead of the switchover valve 50 is simultaneously embodied as a pilot valve, for the purpose of pilot control of the valve combination 51. The switchover valve 52 then carries control pressure drawn from the pressure supply means 6 to the valve combination 51 whenever pressure from the booster chamber 12 or directly from the pressure supply means 6 is to be supplied through this valve combination to at least one of the brake pressure control valves 23–26.

To this end, the valve combination 51 as shown in FIG. 4 has a control cylinder 53, a control piston 54, a distributor chamber 55 connected to the switchover valve 52 and into which the control piston 54 protrudes, a control beam 56 secured transversely on the control piston 54, two control tappets 57, 58 secured on the control beam 56 parallel to the control piston 54, a restoring spring 59 acting upon the control beam 56 in the direction of the control cylinder 53, and a switching position monitoring switch 60 actuatable by the control piston 53. In the extension of the control tappet 57, 58, the valve combination 51 further has two valve chambers 61, 62, which are connected to the distributor chamber 55 via bores 63, 64 disposed concentrically with respect to the control tappets 57, 58. The bores 63, 64 belong to check valves 40a and 41a having balls 65 and 66. Viewed from the direction of the control tappets 57, 58, following the balls 65, 66 there are spring plates 69, 70 urged in the direction of the control tappet by springs 67, 68, and adjoining the spring plates 69, 70 are valve rods 71, 72, then leaf springs 73, 74 oriented transversely to the valve rods 71, 72 and finally, in the extension of the valve rods 71, 72 there are balls 75, 76 belonging to blocking valves 28a, 29a for the brake circuits I and II. Balls 77, 78, 79 and 80 are additionally secured, in a radially movable manner, to the free ends of the leaf springs 73 and 74. These balls 77–80 are components of controllable bypass valves 34a, 35a, 36a and 37a, which in the illustrated positions, which they assume during normal service braking, assure rapid pressure buildup and reduction at wheel brake cylinders not shown.

If non-permissible slip occurs at at least one wheel, which may be a driven wheel, then analogously to the second exemplary embodiment the switchover valve 52 is controlled such that pressure either from the booster chamber 12 or directly from the pressure supply means 6 is directed into the distributor chamber 55. At the same time, as already indicated, the valve combination 51 is pilot controlled by means of this switchover valve 52 and by means of pressure from the pressure supply means 6, which acts upon the control piston 54. This action upon the control piston 54 causes a displacement of the control piston 54 counter to the action of the restoring spring 59, and hence a displacement of the control beam 56 and control tappet 57, 58 as well. As a result, the check valves 40a and 41a are compulsorily opened, so that pressure from the distributor chamber 55 is distributed into the valve chambers 61 and 62. If the control piston 54 has been displaced far enough, then in an analogous manner to the switching position monitoring switch 44 of the first exemplary embodiment, the switching position monitoring switch 60 reports that the valve combination 51 has opened properly. The compulsory opening of the check valves 40a, 41a, via the valve rods 71, 72, causes the closure of the blocking valves 28a and 29a. As a result, no pressure medium can flow out of the valve chambers 61 and 62 to the main cylinder 4. The pressure prevailing in the valve chambers 61 and 62 can thus be applied fully to the wheel brake cylinders as needed, via the brake pressure control valves 23–26. At the same time as the blocking valves 28d and 29a, the bypass valves 34a–37a are closed as well. As a result, pressure in the wheel brake cylinders has to build up, because of the throttling flowthrough conduits 27 disposed in the brake pressure control valves 23–26. Excessively hard braking in the event of wheel lock or drive slip is consequently avoided. If at least one of the brake pressure control valves 23–26 is directed into its pressure reduction position, the bypass valves 34a–37a, which are closed by the valve rods 71, 72, prevent pressure medium from flowing uselessly out of the valve chambers 61, 62 to the equalizing container 7 through the brake pressure control valves 23–26. A return of the switchover valve 52 to its initial position is effected under the same conditions as in the exemplary embodiments described earlier. In the basic position, the switchover valve 52 connects both the distributor chamber 55 and the control cylinder 53 to the equalizing container 7. The common control of the blocking valves 28a and 29a dictated on structural grounds, together with the monitoring of the control travel of the control piston 54 via the switching position monitoring switch 60 assures a high degree of safety, because a deficient supply of braking pressure to the wheel brake cylinders in case of slip cannot occur in either service brake circuit, I or II.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A vehicle brake system for controlling wheel brake slippage and wheel drive slippage having wheel brakes for driven wheels; a brake force booster, which has a booster chamber; a main cylinder, which has at least one brake piston associated with at least one service brake circuit and acted upon by the booster chamber; a pressure source communicating with a control valve actuated by a brake pedal for directing a booster pressure into the booster chamber derived from said pressure source communicating with the control valve; brake pressure control valves associated with the wheel brakes for reducing wheel slippage; and means for temporarily connecting the booster chamber with said brake pressure control valves, a switchover valve connected between the booster chamber and the brake pressure control valves for connecting these pressure control valves with the booster chamber in the event that impermissible brake slippage arises and for connecting said pressure control valves directly with the pressure source in the event that impermissible drive slippage arises at said driven wheels and a blocking valve disposed in each said at least one service brake circuit for blocking off the main cylinder during actuation of the brake pressure control valves.

2. A brake system as defined by claim 1, in which said switchover valve is embodied as a 3/2-way valve, and wherein said means for temporarily connecting said booster chamber with said brake pressure control valve is disposed following said switchover valve in the direction of the brake pressure control valves and is embodied as a 3/2-way valve and actuatable in the event of wheel slippage, and that check valves disposed between the feed valve and said at least one service brake circuit opens into the at least one service brake circuit.

3. A brake system as defined by claim 1, in which said switchover valve is embodied as a 4/3-way valve and simultaneously embodies a feed valve, said switchover valve includes one valve connection which communicates with an equalizing container and that check valves opening into the at least one service brake circuit are disposed between said switchover valve and said brake circuits.

4. A brake system as defined by claim 3, in which said blocking valves together with a control cylinder for controlling said blocking valves in common, and a control piston movable in said control cylinder, are combined into a valve combination, and that said switchover valve is further embodied as a pilot valve supplying said control cylinder with pressure.

5. A brake system as defined by claim 1, in which said brake pressure control valves are embodied such that throttling flowthrough conduits are associated with their brake pressure buildup positions, and bypass valves bypassing the brake pressure control valves for the purpose of rapid pressure reduction after service braking performed by means of the main brake cylinder are disposed beside said brake pressure control valves.

6. A brake system as defined by claim 2, in which said brake pressure control valves are embodied such that throttling flowthrough conduits are associated with their brake pressure buildup positions, and bypass valves bypassing the brake pressure control valves for the purpose of rapid pressure reduction after service braking performed by means of the main brake cylinder are disposed beside said brake pressure control valves.

7. A brake system as defined by claim 3, in which said brake pressure control valves are embodied such that throttling flowthrough conduits are associated with their brake pressure buildup positions, and bypass valves bypassing the brake pressure control valves for the purpose of rapid pressure reduction after service braking performed by means of the main brake cylinder are disposed beside said brake pressure control valves.

8. A brake system as defined by claim 4, in which said brake pressure control valves are embodied such that throttling flowthrough conduits are associated with their brake pressure buildup positions, and bypass valves bypassing the brake pressure control valves for the purpose of rapid pressure reduction after service braking performed by means of the main brake cylinder are disposed beside said brake pressure control valves.

9. A brake system as defined by claim 5, in which said bypass valves are embodied as one-way valves opening toward the main cylinder.

10. A brake system as defined by claim 6, in which said bypass valves are embodied as one-way valves opening toward the main cylinder.

11. A brake system as defined by claim 7, in which said bypass valves are embodied as one-way valves opening toward the main cylinder.

12. A brake system as defined by claim 8, in which said bypass valves are embodied as one-way valves opening toward the main cylinder.

13. A brake system as defined by claim 4, in which said bypass valves are integrated into said valve combination and are closable in common with said blocking valves by means of said control piston.

14. A brake system as defined by claim 5, in which said bypass valves are integrated into said valve combination and are closable in common with said blocking valves by means of said control piston.

15. A brake system as defined by claim 13, in which said bypass valves are openable in the direction of the main cylinder in the manner of check valves.

16. A brake system as defined by claim 14, in which said bypass valves are openable in the direction of the main cylinder in the manner of check valves.

17. A brake system as defined by claim 13, in which said check valves are integrated into said valve combination and are compulsorily openable by means of the control piston.

18. A brake system as defined by claim 15, in which said check valves are integrated into said valve combination and are compulsorily openable by means of the control piston.

19. A brake system as defined by claim 17, in which said control piston protrudes into a distributor chamber connected to said switchover valve and there is oriented centrally toward a transversely extending control beam, control tappets for opening said check valves in a direction of separate valve chambers begin at two free ends of a control beam and are oriented parallel to said control piston, and that spring plates, springs, valve rods and resilient means for controlling the said blocking valves are disposed in extensions of the control tappets following the check valves.

20. A brake system as defined by claim 4, in which said valve combination has a switching position monitoring switch actuatable by said control piston.

* * * * *